July 15, 1947. F. KELLERMAN 2,423,891
BI-FREQUENCY MAGNETIC TESTING APPARATUS
Filed June 17, 1944
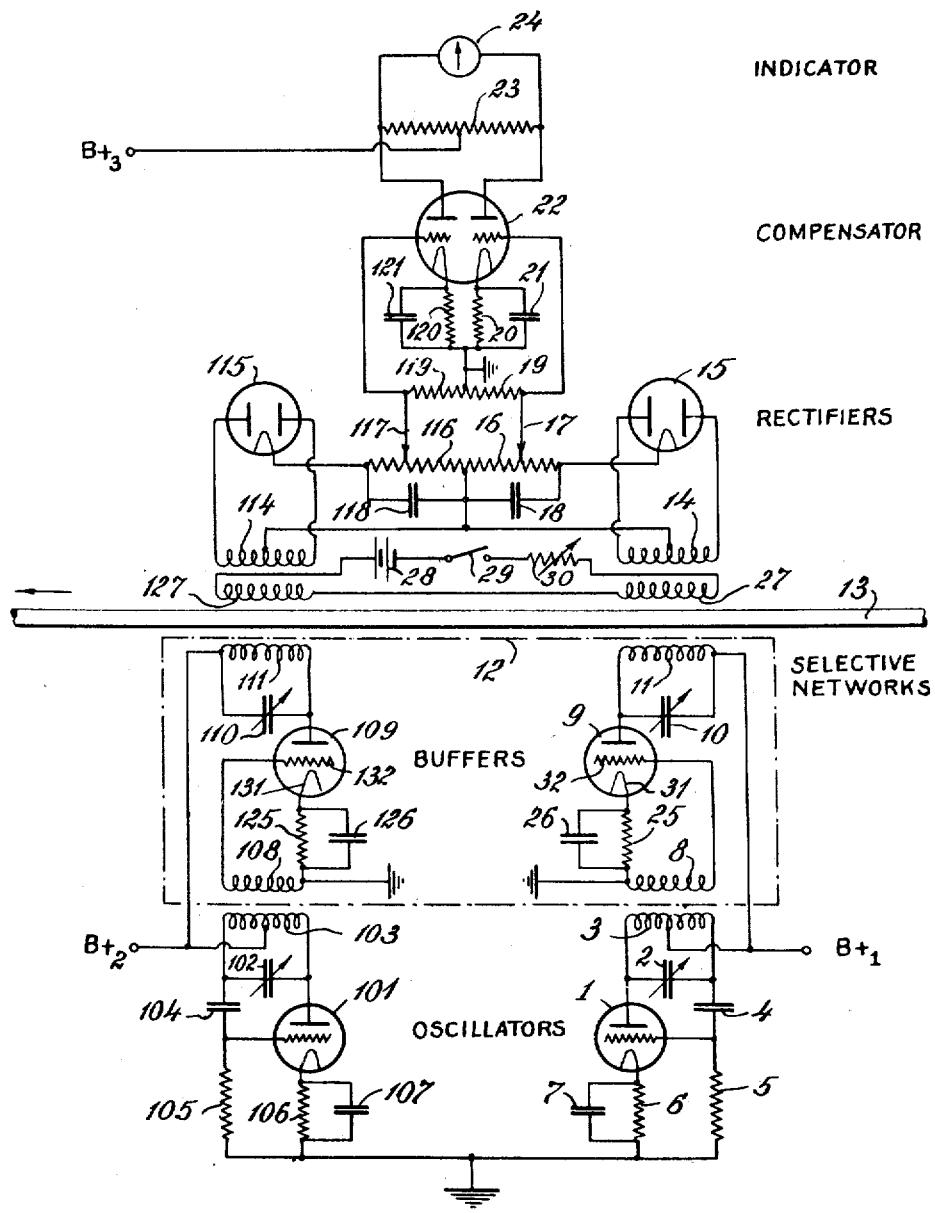
INVENTOR
FREDERICK KELLERMAN
BY
Pennie, Davis, Marvin and Edmonds.
ATTORNEYS Patented July 15, 1947

2,423,891

UNITED STATES PATENT OFFICE 2,423,891

BIFREQUENCY MAGNETIC TESTING APPARATUS

Frederick Kellerman, New York, N. Y., assignor to Magnetic Analysis Corporation, Long Island City, N. Y., a corporation of New York Application June 17, 1944, Serial No. 540,758

7 Claims. (Cl. 175—183)

1

This invention relates to the art of non-destructive testing and inspection of magnetic material and more especially to electromagnetic inspection of such material by use of alternating current fields.

Certain elements of the present invention are similar to those disclosed in U. S. Letters Patent No. 2,329,810 and 2,329,811, granted September 21, 1943, to Theodore Zuschlag, but other elements differ materially therefrom. From these differences result several valuable improvements and advantages.

In the systems of the mentioned patents and in that of the present invention a null point balance should be indicated when the specimen under test is without flaws or variations. Likewise in all three systems, two different alternating current voltages are impressed upon two energizing coils arranged in inductive relation to the material under test. In the systems of the prior patents these energizing voltages were derived either from a single oscillator or from two different oscillators tuned to the same frequency, but in either event were coupled in balanced relation to the material under test so that the frequency of the oscillation source or sources and of the energizing circuits was influenced by the material under test. This arrangement resulted in considerable improvement and reliability over previous systems, but sufficient sensitivity for certain applications could not be achieved due to the mentioned interaction of the energizing coils whereby a given defect in the material under test affected both circuits instead of only one.

In the system of the present invention the disadvantages of the former systems are overcome, in most part, by the provision of two separate, symmetrical and independent alternating-current sources and pickup circuits by which energizing currents are provided at a spaced frequency interval, whereby interaction between the energizing circuits and between the detecting or pickup circuits can be eliminated. Such arrangement obviously does not permit balancing of the alternating-current outputs of the two A. C. current sources directly, as in the manner of the systems of the mentioned patents, so in accordance with the present invention a balance is achieved by different means. By this invention each source, such as an oscillator, together with its corresponding pickup or detector coil, is connected in a separate "signal" channel including a rectifier which rectifies the alternating current induced in the pickup coil. The rectified currents pass through a compensator which may comprise

2 a twin direct-current amplifier, but which in any event should be arranged so as to effectively combine the output currents from the rectifiers, preferably in opposition, so that the resultant of the combined outputs actuates a suitable indicating device.

The invention will be better understood by reference to the drawing wherein the two separate signal channels are readily seen at the two sides of the diagram. It is preferred that these two channels be similar and symmetrical, and for that reason the circuit elements of the second channel (at the left in the drawing) which correspond to those of the first channel, at the right, are designated by the same reference characters plus 100.

As can be seen from the drawing, the system of the present invention includes two oscillators as current sources coupled to the material 13 under test by means of two "buffers," each comprising an amplifier tube together with suitable tuned selective networks. Although the current sources may comprise any suitable sources of alternating current at approximately spaced frequencies, oscillators of the form shown in the drawing have been found to be satisfactory and suitable for the purpose. Each such oscillator may comprise a vacuum tube 1 of any suitable type, although it has been found convenient to employ a tube of the 6A3 type. The magnitudes of grid resistor 5, bias resistor 6 and by-pass condenser 7 should be appropriate for the particular tube employed and need not here be specified. The inductance 3 and variable capacity 2 together comprise a selective network and control the oscillation frequency of this oscillator, and should be proportioned accordingly. Condenser 4 is a coupling condenser and should have a value depending on the oscillator frequency employed, although the value is not especially critical. The positive terminal of a suitable source of direct-current anode potential should be connected to the terminal B+1, the negative terminal of this potential source being grounded.

Coupling the output coil 3 of oscillator 1 to the material 13 under test is a "buffer" including a selective network. This buffer comprises an alternating-current amplifier including a suitable vacuum tube 9. The input to this tube includes an inductance coil 8 which may be similar to coil 3 and inductively coupled thereto. The output circuit of tube 9 includes a selective network comprising variable condenser 10 and inductance 11 connected in parallel with each other. This network is similar to the network 2, 3, and should be tuned to the frequency of the oscillations generated by oscillator 1. Resistor 25 and condenser 26 connected in the return lead to the cathode 31 of tube 9 are for the usual purpose of maintaining the grid 32 of tube 9 at the proper potential with respect to the cathode 31 thereof.

As indicated above, the undesirable interaction between the energizing currents is by this invention substantially eliminated by operating the two oscillators, 1 and 101, at frequencies separated by a sufficient frequency interval, and by other means mentioned below. The interposition of the buffers included within the dash-dot rectangle 12 is primarily for the purpose of isolating even more completely the energizing circuits and energizing currents in the two different channels. These buffers are not limited to the particular form shown and may be of other types, such, for example, as networks embodying inverse feedback at all frequencies but the frequency of the oscillations which are being transferred to the energizing coil. Such networks are described by H. H. Scott in Proceedings of the Institute of Radio Engineers, February, 1938, beginning at page 226. However, the system of the invention has been found to operate for some purposes satisfactorily without the buffers 12, providing that the oscillator circuits are properly shielded and energizing coils 11, 111 are sufficiently separated from each other. When these coils are coupled to spaced portions of the same specimen of material the undesired interaction has been found to be more effectively minimized by minimizing the electro-magnetic coupling than by extreme frequency separation. Hence, especially when the buffers are not employed greater precautions to separate the channels electromagnetically should be taken. In some instances the latter arrangement is preferable because it results in a larger variation of oscillator output in response to a change in the effective inductance due to the presence of a defect in the material under inspection. A frequency separation between the sources of alternating currents of say 1,000 or 2,000 cycles has been found to be usually sufficient, and the actual frequencies employed may comprise a large range. For example, satisfactory results have been achieved using oscillator frequencies ranging between approximately 4,000 and 16,000 cycles.

Energizing coils 11 and 111 are disposed so that they may be placed in inductive relation to the material 13 under inspection, which in the figure is shown as moving from right to left through the fields of the coil systems. For purposes of illustration, the material 13 is represented to be bar stock, but metallic material of practically any shape or dimensions may be satisfactorily inspected with equipment according to the present invention.

Pickup or detector coils 14 and 114, each connected in its respective channel, are similar and are connected in rectifier circuits as shown. Coil 14 may, for example, be similar to coil 11, is adjacent and coupled to it, and also is positioned to be in inductive relation to the material 13. The two terminals of coil 14 are connected, respectively, to the two anodes of full-wave rectifier 15, the cathode of rectifier 15 being connected to one terminal of resistor 16. Rectifier 115 is similarly connected to coil 114 and to resistor 116. Resistors 16 and 116, which are connected together in series, can be considered to be a single resistor having a center tap which is connected to the center taps of pickup coils 14 and 114, respectively. These two resistors may be of about 25,000 ohms each when employed with the other components here suggested. Bypass condensers 18 and 118 are connected, as shown, across resistor portions 16 and 116 to improve the rectifier action. Each of resistor portions 16 and 116 is provided with a variable contactor 17 and 117, respectively. These contactors are employed in making initial adjustments of the system to compensate for irregularities resulting in lack of symmetry or balance between the two channels as indicated on the meter 24, and thus may be considered to be manually adjustable compensator controls.

Coupled to the output of the rectifiers is the twin compensator stage comprising twin vacuum tube amplifiers 22 with associated apparatus. In the arrangement shown, these amplifiers are of the direct-current type. Although a separate triode is provided for the signals in each channel, it is convenient to combine the triodes in a single structure 22, such as the type 6SN7 twin triode tube. The inputs of these two triodes are coupled to the outputs of rectifiers 15 and 115 by resistor portions 19 and 119, respectively. These resistor portions which may be say 40,000 ohms each, are connected together in series, the extreme terminals thereof being connected between adjustable contactors 17 and 117 on resistor 16—116. The terminals of resistor 19—119 are connected to the respective grids of the twin triode 22. A center tap on resistor 19—119 is connected to the two cathodes of tube 22 through cathode resistors 20 and 120, respectively, these resistors being shunted by condensers 21 and 121, respectively, as is the practice in the art. Amplifier 22 may comprise more stages if desired or may otherwise vary from the form shown. If great sensitivity is not required, this amplifier may be omitted, and the meter 24 connected directly to adjustable contactors 17 and 117 instead of to the anodes of tube 22.

The outputs of amplifier 22 are coupled or connected, as required, to an indicator 24. This indicator may be of any suitable type of meter such as a zero-center galvanometer. An instrument suitable for this purpose has been found to be one providing full scale deflection at 100 microamperes. For some purposes it has been found preferable to substitute a cathode ray oscillograph for the meter 24. The value of coupling resistor 23 should be chosen in accordance with the effective output resistance of the tube 22 and of the resistance of meter 24. In connection with the apparatus above designated it could be of the order of 20,000 ohms.

In order further to prevent interaction between the two signal channels it is preferable that the sources of anode potential for the various tubes employed be separate. Therefore the source of anode potential $B+_1$ for the tubes 1 and 9 is different from the source $B+_2$ for the tubes 101 and 109. Likewise it has been found advantageous to employ a separate source of potential $B+_3$ for the anodes of amplifier 22. However, these potential sources could be combined if proper precautions were taken by the use of adequate filters and bypasses, and by employing a large-capacity power source to prevent undesired interactions between the channels.

The apparatus in accordance with the present invention may include a direct-current energizing circuit comprising a direct-current source 28, control switch 29, a variable resistor or rheostat 30 and direct-current coils 27 and 127. An extensive explanation and discussion of the use of a direct-current field in connection with an alternating-current field for magnetic testing and inspection of materials is given at page 3 of the mentioned Patent No. 2,329,810 and therefore need not be repeated here.

Coils 27 and 127 are positioned in the first and second signal channels, respectively, and each should preferably be arranged in a symmetrical assembly with the other two coils with which it is associated. In any event it should, of course, be placed in inductive relation to the material 13 to be inspected. Usually it is preferable that this material under inspection be placed within all of the mentioned coils, as is illustrated for example in Fig. 3 of the last-mentioned patent. Under certain conditions it is preferable that this material not pass through the coils but pass adjacent them. Such an eccentric but symmetrical arrangement is shown in Fig. 4 of the last-mentioned patent, and is explained in more detail in application for U. S. Letters Patent, Ser. No. 334,790, filed May 13, 1940, by Theodore Zuschlag, now Patent No. 2,353,211, wherein the advantages of using coils of very small dimensions are described. In order to minimize couplings between the channels the group of coils in one channel should be physically separated from the group in the other channel, or suitable shielding may be used; or both expedients may be required.

What is claimed is:

1. In apparatus for electromagnetic inspection of material, a first signal channel including as elements a source of alternating current, frequency-selective means for establishing an electromagnetic field at the frequency of said source, means whereby the material under inspection may be subjected to said field, a pickup coil positioned to be inductively related to said material and to said field, and a rectifier having input and output circuits and connected to rectify current induced in said coil, a second electrically separate signal channel including elements similar and corresponding to those included in said first channel, the frequencies of the respective sources of alternating current being such as to differ by an interval sufficient to prevent effective interaction between alternating-current portions of said channels, the energizing and pickup coils of said channels being electromagnetically coupled to spaced portions of the material to be inspected, an indicator actuated in response to the resultant of combined output currents from both of said rectifiers, a compensator including coupling means symmetrically connected to the output circuits of said rectifiers and means coupling said compensator to said indicator.

2. In apparatus for electromagnetic inspection of material, first and second frequency-selective networks each including an energizing coil arranged to be inductively related to the material under inspection, said coils being inductively related to spaced portions of said material, first and second alternating-current sources connected to energize said coils respectively with currents at substantially different frequencies, said coils being tuned to said frequencies, respectively, first and second rectifiers having input and output circuits, each said input circuit including a pickup coil inductively related to the corresponding one only of said energizing coils and proportioned to receive energy therefrom as modified by said material, an indicator actuated in response to the resultant of combined output currents from both of said rectifiers, and a compensator including coupling means symmetrically connected to the output circuits of said rectifiers and to said indicator, said coupling means including means for adjusting the relative magnitudes of said rectified currents which are combined effectively to actuate said indicator.

3. In apparatus for electromagnetic inspection of material, first and second frequency-selective networks each including an energizing coil tuned to a different frequency and arranged to be inductively related to the material under inspection, said coils being inductively related to spaced portions of said material, first and second alternating-current sources connected to energize said coils, respectively, at said different frequencies, first and second rectifiers having input and output circuits, each said input circuit including a pickup coil inductively related to the corresponding one only of said energizing coils and proportioned to receive energy therefrom as modified by said material, a compensator circuit connected to the output circuits of both of said rectifiers, said compensator circuit including two separate thermionic amplifiers each having an anode and a grid of which said grid is coupled to the output circuit of the corresponding rectifier, respectively, means for adjusting the potential impressed on each grid from the corresponding rectifier, an indicator, and connections from said indicator to both of said anodes.

4. In apparatus for electromagnetic inspection of material; first and second electrically separated frequency-selective networks each including an energizing coil tuned to a separably different frequency and arranged to be inductively related to the material under inspection, said coils being inductively related to spaced portions of said material; first and second alternating-current sources connected to energize said coils, respectively, at said different frequencies; first and second rectifier circuits each including a pickup coil inductively related to the corresponding one only of said energizing coils and proportioned to receive energy therefrom as modified by said material, and a full-wave rectifier having a cathode and two anodes, said anodes being connected to the two terminals respectively of said pickup coil; a resistor the terminals of which are connected between the cathodes of both said rectifiers; a connection from the midpoint of each pickup coil to the midpoint of said resistor; two variable contactors on said resistor; two thermionic amplifiers each having a grid, an anode and a cathode; a second resistor connected between said variable contactors and also between said grids; connections from the midpoint of said second resistor to the cathodes of said amplifiers; an impedance connected between the anodes of said amplifier; an indicator; and connections from said last-named anodes to said indicator.

5. In apparatus for electromagnetic inspection of material, first and second sources of alternating current of different frequencies spaced by a frequency interval sufficient to ensure separation of said frequencies, a separate buffer circuit coupled to each said source, each buffer circuit being adjusted to accept and to pass substantially only the frequency of the source to which it is coupled and to minimize reflected coupling into said source, a selective network in each buffer circuit including an energizing coil positioned to be in inductive relation to the material under inspection, said energizing coils being disposed in inductive relation to spaced portions of said material, first and second rectifier circuits each including a pickup coil positioned to be in inductive relation to a corresponding one only of said energizing coils and proportioned to receive energy therefrom as modified by said material, an indicator actuated in response to the resultant of combined output currents from both of said rectifiers, and a compensator including coupling means symmetrically connected to the output circuits of said rectifiers and to said indicator, said coupling means including means for adjusting the relative magnitudes of said rectified currents which are combined effectively to actuate said indicator.

6. In apparatus for electromagnetic inspection of material, two similar signal channels, each channel including an oscillator, said oscillators being adjusted to oscillate at different frequencies, an energizing coil disposed to be electromagnetically coupled to the material to be inspected for electromagnetically coupling the effective output of each said oscillator separately and simultaneously to a different portion of said material, said coils being coupled to spaced portions of said material, a rectifier having input and output circuits connected in each channel, a pickup coil effectively connected to the input circuit of each rectifier and positioned to be in inductive relation to said material and to the energizing coil only in the same channel, circuit means connected in the output circuits of said rectifiers wherein the rectifier currents from said rectifiers are effectively combined in opposition, and an indicating device connected to be actuated in response to the resultant of said combined currents.

7. In apparatus for electromagnetic inspection of material, two similar signal channels, each channel including an alternating-current source, said sources being of different frequencies spaced by a frequency interval such as to minimize interaction between said channels, an energizing coil in each said channel disposed to be electromagnetically coupled to the material to be inspected for electromagnetically coupling each said source separately to said material, said coils being coupled to spaced portions of said material, a rectifier having input and output circuits connected in each channel, a pickup coil effectively connected to the input circuit of each rectifier and positioned to be in inductive relation to said material and to the energizing coil only in the same channel, circuit means connected in the output circuits of said rectifiers wherein the rectified currents from said rectifiers are effectively combined, means for adjusting the relative magnitudes of said rectified currents which are effectively combined, and an indicating device connected to be actuated in response to the resultant of said combined currents.

FREDERICK KELLERMAN.

REFERENCES CITED

The following references are of record in the file of this patent:

UNITED STATES PATENTS

| Number | Name | Date |
|---|---|---|
| 2,205,190 | Farrington | June 18, 1940 |
| 2,258,837 | Zuschlag | Oct. 14, 1941 |
| 2,329,810 | Zuschlag | Sept. 21, 1943 |
| 2,329,811 | Zuschlag | Sept. 21, 1943 |

Certificate of Correction

Patent No. 2,423,891.                                                July 15, 1947.

FREDERICK KELLERMAN

It is hereby certified that error appears in the printed specification of the above numbered patent requiring correction as follows: Column 2, line 24, for the word "approximately" read *appropriately*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.* tion, said energizing coils being disposed in inductive relation to spaced portions of said material, first and second rectifier circuits each including a pickup coil positioned to be in inductive relation to a corresponding one only of said energizing coils and proportioned to receive energy therefrom as modified by said material, an indicator actuated in response to the resultant of combined output currents from both of said rectifiers, and a compensator including coupling means symmetrically connected to the output circuits of said rectifiers and to said indicator, said coupling means including means for adjusting the relative magnitudes of said rectified currents which are combined effectively to actuate said indicator.

6. In apparatus for electromagnetic inspection of material, two similar signal channels, each channel including an oscillator, said oscillators being adjusted to oscillate at different frequencies, an energizing coil disposed to be electromagnetically coupled to the material to be inspected for electromagnetically coupling the effective output of each said oscillator separately and simultaneously to a different portion of said material, said coils being coupled to spaced portions of said material, a rectifier having input and output circuits connected in each channel, a pickup coil effectively connected to the input circuit of each rectifier and positioned to be in inductive relation to said material and to the energizing coil only in the same channel, circuit means connected in the output circuits of said rectifiers wherein the rectifier currents from said rectifiers are effectively combined in opposition, and an indicating device connected to be actuated in response to the resultant of said combined currents.

7. In apparatus for electromagnetic inspection of material, two similar signal channels, each channel including an alternating-current source, said sources being of different frequencies spaced by a frequency interval such as to minimize interaction between said channels, an energizing coil in each said channel disposed to be electromagnetically coupled to the material to be inspected for electromagnetically coupling each said source separately to said material, said coils being coupled to spaced portions of said material, a rectifier having input and output circuits connected in each channel, a pickup coil effectively connected to the input circuit of each rectifier and positioned to be in inductive relation to said material and to the energizing coil only in the same channel, circuit means connected in the output circuits of said rectifiers wherein the rectified currents from said rectifiers are effectively combined, means for adjusting the relative magnitudes of said rectified currents which are effectively combined, and an indicating device connected to be actuated in response to the resultant of said combined currents.

FREDERICK KELLERMAN.

REFERENCES CITED

The following references are of record in the file of this patent:

UNITED STATES PATENTS

| Number | Name | Date |
| --- | --- | --- |
| 2,205,190 | Farrington | June 18, 1940 |
| 2,258,837 | Zuschlag | Oct. 14, 1941 |
| 2,329,810 | Zuschlag | Sept. 21, 1943 |
| 2,329,811 | Zuschlag | Sept. 21, 1943 |

---

Certificate of Correction

Patent No. 2,423,891.                                                July 15, 1947.

FREDERICK KELLERMAN

It is hereby certified that error appears in the printed specification of the above numbered patent requiring correction as follows: Column 2, line 24, for the word "approximately" read *appropriately*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.*